United States Patent [19]

Zulch et al.

[11] Patent Number: 4,489,322
[45] Date of Patent: Dec. 18, 1984

[54] RADAR CALIBRATION USING DIRECT MEASUREMENT EQUIPMENT AND OBLIQUE PHOTOMETRY

[75] Inventors: Donald I. Zulch, Oneida; Robert H. Brock, Jr., Marcellus, both of N.Y.

[73] Assignee: The United States of America as represented by the Secretary of the Air Force, Washington, D.C.

[21] Appl. No.: 461,427

[22] Filed: Jan. 27, 1983

[51] Int. Cl.³ .......................... G01S 7/40; G01S 9/02
[52] U.S. Cl. .................................. 343/17.7; 343/16 M
[58] Field of Search ................. 343/16 M, 17.7, 7.4, 343/5 CM, 6 R, 12 R, 5 DP, 5 SC, 6 ND, 6 TV

[56] References Cited

U.S. PATENT DOCUMENTS

| | | | |
|---|---|---|---|
| 3,076,961 | 2/1963 | Bibbero | 343/6 ND |
| 3,239,836 | 3/1966 | Chubb et al. | 343/16 M X |
| 3,307,177 | 2/1967 | Novak | 343/6 ND |
| 3,315,257 | 4/1967 | Sauberlich | 343/12 R |
| 3,934,250 | 1/1976 | Martin, Jr. | 343/7.4 |
| 4,050,067 | 9/1977 | Elmore, Jr. | 343/5 PC |
| 4,148,029 | 4/1979 | Quesinberry | 343/5 DP |
| 4,199,759 | 4/1980 | Zulch et al. | 343/6 R |

OTHER PUBLICATIONS

Donald Rhodes, "Introduction of Monopulse" McGraw-Hill, 1959.

Primary Examiner—Maynard R. Wilbur
Assistant Examiner—Brian Steinberger
Attorney, Agent, or Firm—Donald J. Singer; William Stepanishen

[57] ABSTRACT

A radar calibration apparatus for the metric measurement of ground position by airborne photogrametry using real time high precision imagery, the transformation of those measurements from camera coordinates to antenna coordinates, the conversion of transformed coordinates to direction cosines of a measured ground position, comparison to radar derived direction, and the calculation and automatic correction of bias errors in direction of the radar measurement.

7 Claims, 2 Drawing Figures

RADAR CALIBRATION USING DIRECT MEASUREMENT EQUIPMENT AND OBLIQUE PHOTOMETRY

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a radar calibration apparatus, and in particular to a calibration apparatus utilizing direct measurement equipment in conjunction with oblique photometry.

The recent emergence of single aircraft active and passive sensor systems with highly directive arrays have identified the need for accurate calibration of the sensor angle indicators and range indicator (for active systems) devices. A number of calibration schemes for for sensors are presently in use but most of procedures are limited since they violate one or more fundamentals which are basic to calibration. A system undergoing calibration should use an independent measurement scheme in order to determine if bias errors are present. Additionally, the calibration measurement system must be compared to a standard, and the calibration process must be dynamic with observations in the direction that the sensor is pointing and in the environment that the sensor is to operate.

Radar using precision ranging and monopulse tracking can locate ground targets in geodetic coordinates. Large RF bandwidth and large phased arrays make possible range measurements with standard errors of a few feet and standard error in directivity of a fraction of a milliradian. Inertial equipment in the aircraft on which the radar is mounted and gyros mounted on the radar antenna provide accurate antenna coordinate orientation in inertial space. Monopulse technique provides continuous track of ground targets and provides accurate angle error information. Angle error is continuously adjusted to zero by altering phase of antenna elements in the radar array, maintaining continuous track of the ground target. Angle indicator provides measurement of the direction to the target or terrain features with respect to the local coordinate system.

SUMMARY OF THE INVENTION

The present invention utilizes an oblique camera system to establish independent ground measurements to provide a correction signal to the monopulse beam angle steering unit of the monopulse radar unit thereby correcting for errors in the radar pointing and to provide independent measurement of position of terrain features or targets. The oblique camera system which is ancillary to the radar, is mounted on the same platform as the radar unit and provides independent precision measurements for calibration of the radar unit. Oblique photography provides simultaneous observation of the ground directly under the aircraft on which the radar is mounted, as well as the ground, and target and terrain features that are forward of the aircraft. The camera system provides the position of the aircraft in space with respect to the local geodetic terrain features and independent angle measurement of the target being tracked. This measurement is also tied to the geodetic terrain features which are observed by the vertical camera. A geodetically positioned radar target for precision calibration or a target of opportunity for calibration checks and periodic error correction are used by the camera system to provide the real time radar calibration. The position of the terrain features and target are read from the cameras, thus exterior orientation of the camera system is obtained. The camera coordinate system is rotated and translated to coincide radar coordinates. The target angle direction which is obtained by the oblique camera, and is now in common coordinates, is used to provide the error correction signal to the radar antenna beam positioning.

It is one object of the present invention, therefore, to provide an improved radar calibration apparatus utilizing direct measurement equipment and oblique photogrammetry.

It is another object of the invention to provide an improved radar calibration apparatus wherein use of oblique camera imagery to determine correction for bias errors in radar angle measurement;

It is another object of the invention to provide an improved radar calibration apparatus wherein use of oblique camera imagery to determine aircraft position and orientation;

It is another object of the invention to provide an improved radar calibration apparatus wherein use of oblique camera imagery to correct radar antenna pointing;

It is a further object of the invention to provide an improved radar calibration apparatus wherein use of oblique camera imagery for the correlation of radar imagery and cartographic data;

It is still another object of the invention to provide an improved radar calibration apparatus wherein use of oblique camera inagery for the location of terrain feature-target combination and geodetic control used to position ground beacons, a part of the aircraft position system by multilateration;

It is yet another object of the invention to provide an improved radar calibration apparatus wherein provides a novel method of correcting in real time the pointing of airborne radar monopulse antenna;

It is still a further object of the invention to provide an improved radar calibration apparatus wherein provides an independent measurement of ground targets and terrain features for correlation of radar images with radar pointing and cartographic data;

It is another further object of the invention to provide an improved radar calibration apparatus wherein provides a means of correlating terrain features, tracked targets, calibrated ground control points and geodetic and cartographic data bases These and other advantages, objects and features of the invention will become more apparent after considering the following description taken in conjunction with the illustrative embodiment in the accompanying drawings.

DESCRIPTION OF THE PREFERRED EMBODIMENT

Figure 1:
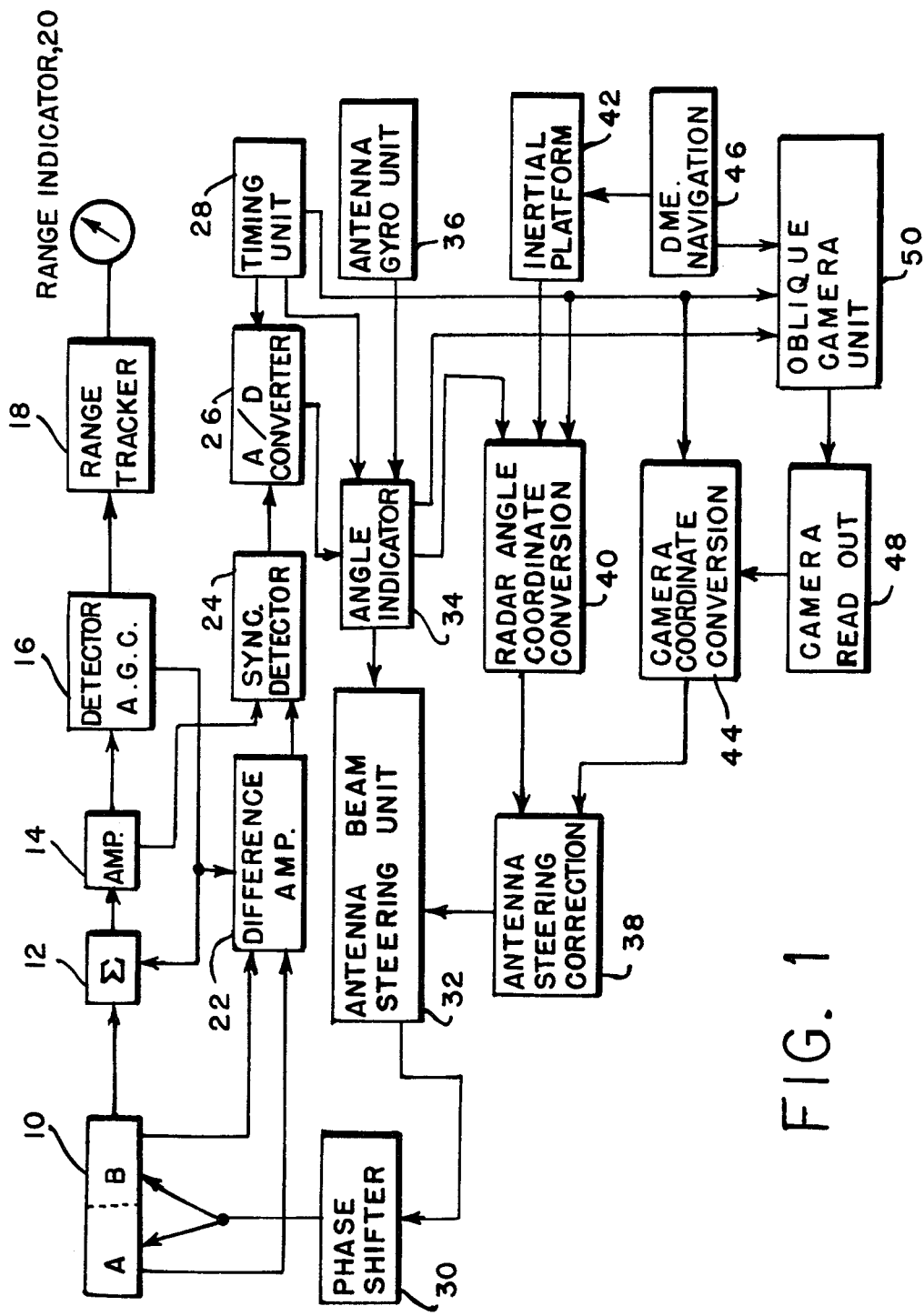
FIG. 1 is a block diagram of the radar calibration apparatus according to the present apparatus, and, FIG. 2 is a graphical representation of a general mathematical model utilizing radar, direct measurement equipment (DME) positioning and cartographic mapping.

Referring now the FIG. 1, there is shown a functional block diagram of a single coordinate monopulse radar with phase array radar antenna 10. The radar unit which is located in an airborne platform is utilized to observe terrain, terrain features and ground targets. The antenna unit 10 is located in inertial space by an antenna unit 36 which is gyro affixed to the antenna. The antenna unit 10 is positioned in space by a conventional inertial platform unit 42. The antennal unit 10 is a phased array which is comprised of a large number of individual electrically-controlled elements. The phase of each of the phased array element is controlled by a beam steering unit 32 which controls the phase of each phased array element to provide a maximum signal summation in the direction that is commanded. The antenna unit 10, is electrically divided into two sections, A, B which results in two separate beams in space with a slight angle separation. The two antenna signal segments which are divided, are processed in sum and difference signal channels. The sum channel which acquires the targets initially provides a range measurement indication by means of range indicator 20. The difference between the summed signals and the adjacent segments (A and B) provides an error indicating how far the target or terrain feature is to the left or right of the antenna bore sight. The sense of the resultant signal is the directivity of the antenna.

Referring to the monopulse portion of FIG. 1, the sum channel comprises the summing unit 12, the amplifier unit 14 and the detector AGC unit 16. These units of the sum channel, develop a common reference which is utilized in the difference channel by difference amplifier unit 22. The sum channel also, detects the return signal, sets the automatic gain control levels, and provides signals to the range tracking unit 18. The range to the target is determined in the range tracking unit 18 and is displayed by the range indicator 20.

The difference channel comprises the difference amplifier unit 22 and the synchronous detector unit 24. The difference channel develops the angle error voltage which is linearly proportional to the position of the beam from the bore sight. The automatic gain control normalizes the error voltage over large dynamic range of input signals. The synchronous detector unit 24 is driven hard by the received signal and acts as a gated rectifier of the amplified difference signal. A voltage which is proportional to the ratio of the difference signal and the sum signal and is linearly related to angle off boresight is generated by the synchronous detector unit 24. The analog voltage output from the synchronous detector unit 24 is applied to the A/D converter unit 26 where it is converted to a digital signal. The digital signal is applied through the angle indicator unit 34 to the antenna beam steering unit 32.

A timing generator, unit 28, provides a time synchronization signal for digital circuitry 26 and assures that the ancillary oblique camera system is synchronized to a common time reference. The antenna gyro unit 36 provides three axis rotational information to the angle indicator unit 34 for angle coordinate correction to inertial space. The corrected angle information is provided to the antenna beam steering unit 32 for the addition or subtraction of the commanded beam steering angle. The beam steering unit 32 sends commands to the antenna phase shifter unit 30. The phases of each antenna element are adjusted to alter the antenna beam position to the corrected position. The operation of this part of the present invention comprises the monopulse receiver system. A complete description of a monopulse radar is given in the reference text entitled, "Introduction to Monopulse", by Donald Rhodes, published in 1959 by McGraw-Hill Book Co. The prior art is summarized in U.S. Pat. No. 3,239,836 "Simplified Monopulse Radar Receiver, Mar. 8, 1966.

The independent camera measurement and calibration system comprises an oblique camera system 50 with ancillary camera readout 48, a camera coordinate conversion unit 44 and a ground target measurement unit 46. The oblique camera measurement unit 50 accepts radar derived angle information from the angle indicator unit 34, aircraft position information from an aircraft navigation and distance measurement unit 46 and aircraft altitude and additional position data from a standard LN-22 inertial platform system unit 42. The oblique camera unit 50 provide terrain and target information to the camera readout unit 48 which is connected to the camera coordinate conversion unit 44. The output from the camera conversion unit 44 provides angle correction data to the antenna beam steering unit 32 to correct for bias errors in the radar observations when observing calibration targets and to provide periodic checks when observing geodetically known terrain features.

The oblique camera unit 50 is a dual camera system with a field of view directly under the radar platform and field view in the direction of the radar beam. The oblique camera unit 50 provides imagery that is overlapping and contains known geodetic features as well as the target being tracked by the radar. The target which may be used as a calibration source has known position in geodetic coordinates. Ground pass points which are common to both radar and camera images are also known geodetic positions. The camera exposure is synchronized by the system timing unit 28, such that the camera image is taken at the same time as the radar angle measurement. The camera image is scanned and known geodetic features and the radar calibration target position are obtained from the camera image and measured with respect to internal camera calibration points. The measurement and calculation of position and angles is accomplished in the camera readout unit 48. The camera oriented coordinates from the camera read out unit 48 are converted to inertial coordinates by using altitude information from inertial platform unit 42 and from the position which is determined from DME navigation unit 46. Camera coordinate conversion in unit 44 is accomplished in the inertial frame of reference. The camera coordinate conversion unit 44 computes the direction, cosines and angles of the target from the camera nadir and provides a correction signal to the image points for errors in exterior orientation, just as the radar derived angle is coordinate converted to inertial space by angle coordinate conversion unit 40. The radar angle coordinate conversion data and camera derived angle information is applied to the antenna steering correction unit 38, where the difference between radar and optical angles are determined and is applied to the antenna beam steering unit 32, as a correction signal. The corrected angle is read in continuously while both radar and camera system are operating and is the sum of all the error components that comprise the difference between the optical observation and the radar observation.

Figure 2:
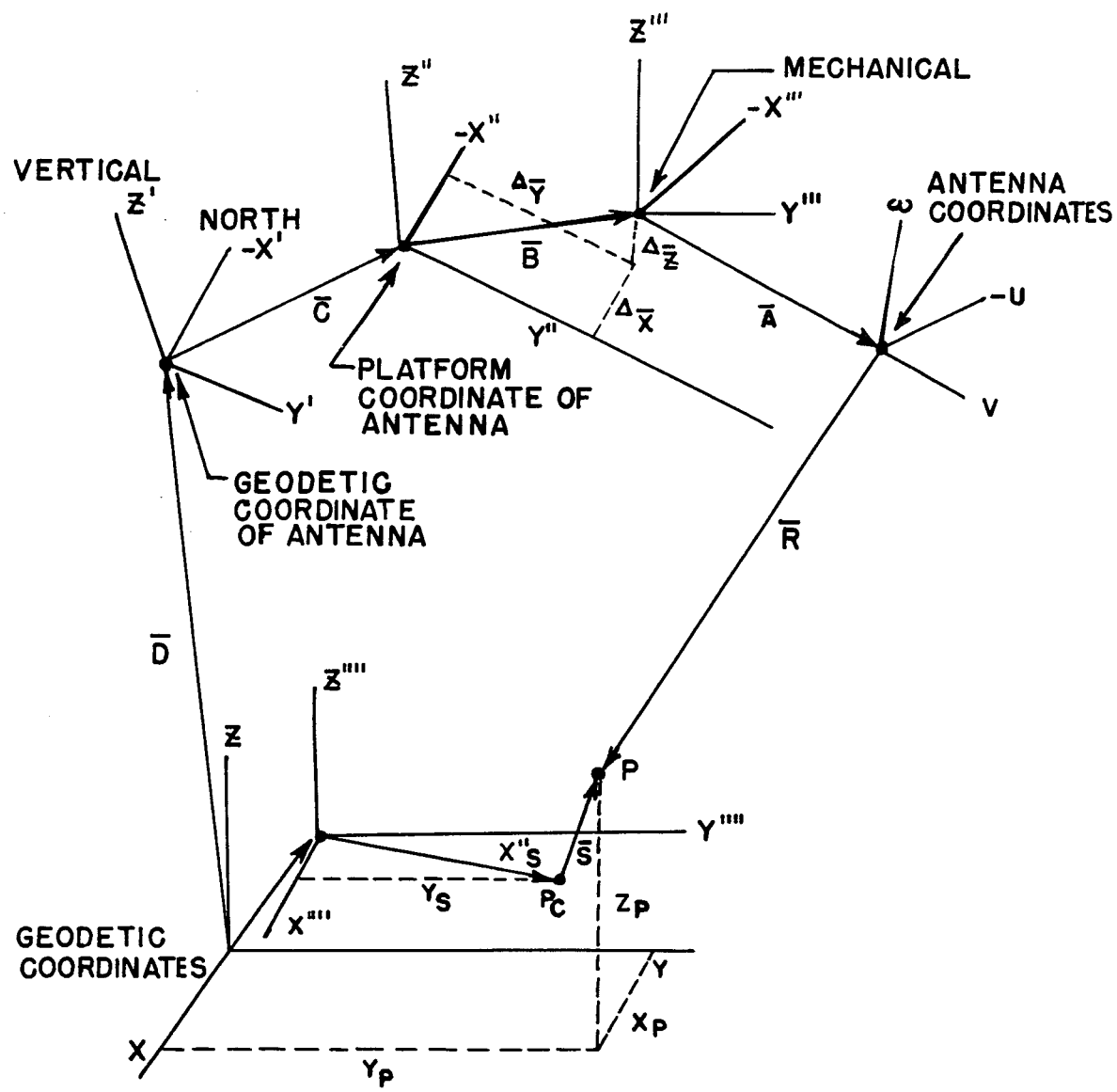

A general mathematical model describing monopulse and SAR,DME positioning, cartographic mapping has been selected as an illustrative utilization of the present invention. The description of the operating principles of this all encompassing model is taken in conjunction to the graphical representation in FIG. 2. The following symbols will be used in the description of the present example and are defined as follows:

P = point being observed
$P_c$ = carto position of P
R = SAC observation of P
A = Rotation of antenna to mechanical axis of antenna
B = Rotations of antenna is to platform coordinate
C = Rotation of platform coordinates of antenna to geocentric coordinate of antenna
D = Rotation of geocentric coordinate of antenna to local coordinate
E = rotation of local coordinate of antenna to map coordinate
F = location of Point $P_c$ in map coordinate
S = error correlation of map and radar observation of Point P Point P is an observed quantity and lies in coordinate X, Y, Z. Since Point P is located on the earth in X, Y, Z coordinates, the coordinates are UTM coordinates. Point Pc is the location of Point P in cartographic coordinates. DMA digitized cartographic map products currently available, are in UTM coordination and are useful for tactical application. In FIG. 2, R is the observation vector from the radar antenna to Point P. The coordinate system, W, U and V is the electronically determined coordinates of the antenna, $\overline{A}$ vector rotates the electrically determined coordination to the coordinates of the mechanical structure of the antenna physically located in coordinate system $X'''$, $Y'''$, $Z'''$. Note that if the observed point P is a known calibration point, its position in the X, Y, Z coordinate system has zero variance, and the mechanical orientation of the antenna is statically fixed in space; then the relationship of the vectors A and B and the coordinate system W, U, V and $X'''$, $Y'''$ and $Z'''$ are calibrated in UTM coordinates. Gyros and accelerometers fastened to the mechanical antenna structure provides the orientation and stabilization data for vector $\overline{B}$, rotating $X'''$, $Y'''$, $Z'''$ into coordinates of the platform carrying the antenna. Inertial platforms and doppler navigation equipment provides data that rotates platform coordinates $Z''$, $X''$, $Y''$ into geocentric coordinate system. Finally, DME navigation using multiple paths and surveyed around stations in earth coordinate system X, Y, Z rotates the geocentric coordinates into the earth coordinate system.

Through a series of rotations and translations, vectors $\overline{A}$ through $\overline{D}$, the observed point P is located in coordinate system X, Y, Z as $X_p$, $Y_p$, $Z_p$ where coordinates w, $z'''$, $z''$ and $z'$ are vertical and U, $X'''$, $X''$, $X'$ are north heading. The orientation of these coordinates and the location of point P depends on ancillary sensors, on the antenna and platform, calibration of electrical antenna beam pointing and external measurements of the platform three dimensional position with respect to the local geodetic system combined with on-board determination of heading. In airborne radar instrumentation, great emphasis is placed on establishing heading and determining accurate doppler, so zero doppler vector can be identified which is necessary for good resolution. The orientation of antenna and platform is stabilized or the orientation is determined to an accuracy (or electronic correlation can compensate to the point) where resolution is not impared, or where high frequency variations in orientation will be smoothed to acceptable level.

Although the invention has been described with reference to a particular embodiment, it will be understood to those skilled in the art that the invention is capable of a variety of alternative embodiments within the spirit and scoppe of the appended claims.

What is claimed is:

1. A radar calibration apparatus comprising in combination:
   a radar unit with electronically steerable phased-array antenna to produce a radar beam, said radar unit being located on an airborne platform to observe terrain, terrain features and ground targets and to provide radar derived angle data;
   means for navigation mounted on said airborne platform to provide position information and distance measurements, and
   an oblique camera means located on said airborne platform to provide a first image of the field of view directly under said airborne platform and a second image of the field of view in the direction of said radar beam, said oblique camera means receiving a timing signal from said radar unit to synchronize the camera exposure to the same time as the radar angle measurement, said first and second images are scanned in said camera means to obtain angle and position measurements and of said terrain, terrain features and ground targets, said camera means receiving position information and distance measurements from said navigation means, said camera means providing an error correction signal to said radar unit to correct the difference between the radar beam angle and the camera optical angle.

2. A radar calibration apparatus as described in claim 1 wherein said radar unit comprises a single coordinate monopulse radar.

3. A radar calibration apparatus as described in claim 1 wherein said camera means comprises:
   an oblique camera unit to produce said first and second images,
   a camera readout unit to utilize said first and second images from said oblique camera unit to provide angle and position measurements, and,
   a camera coordinate conversion means to receive said angle and position measurements from said camera readout unit, said camera coordinate conversion means providing said error correction signal.

4. A radar calibration apparatus as described in claim 1 wherein said camera means comprises a dual camera system to provide a direct vertical image and an oblique image in the radar beam direction.

5. A radar calibration apparatus as described in claim 1 wherein said camera means provides oblique camera imagery which is utilized to determine the position and orientation of said airborne platform.

6. A radar calibration apparatus ad described in claim 1 wherein said camera means provides oblique camera imagery to correct said radar antenna pointing.

7. A radar calibration apparatus as described in claim 1 wherein camera imagery for the correlation of radar imagery and cartographic data.

* * * * *